March 25, 1969　　O. BEESCH　　3,434,461
SEALING ARRANGEMENT
Filed June 30, 1966
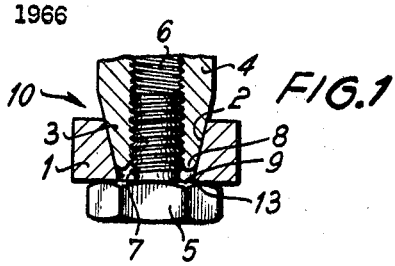
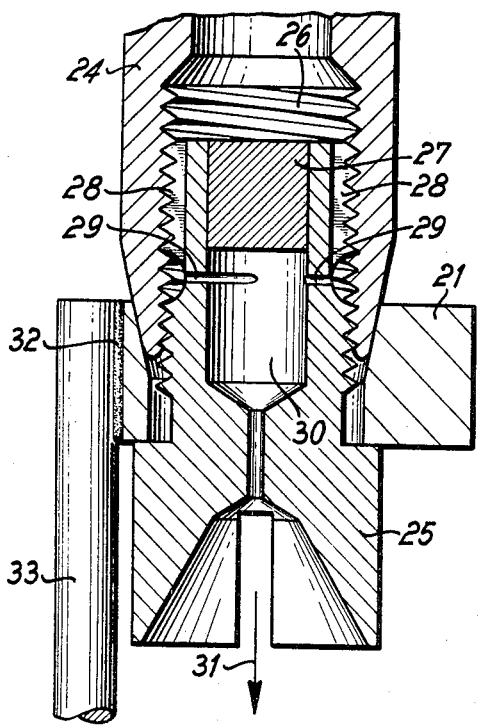
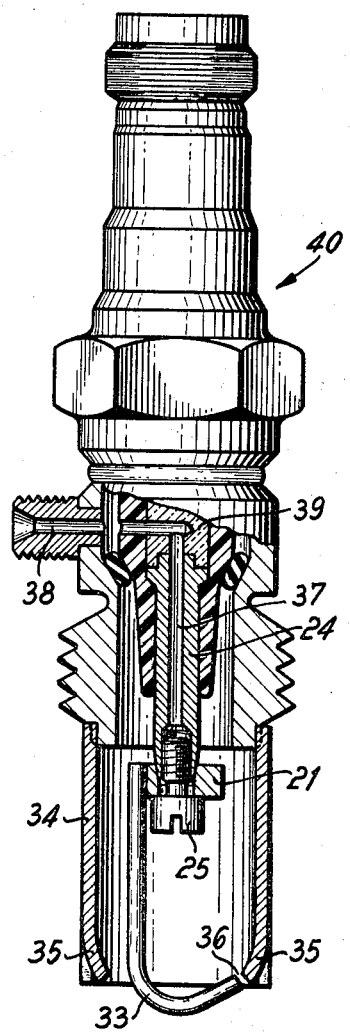
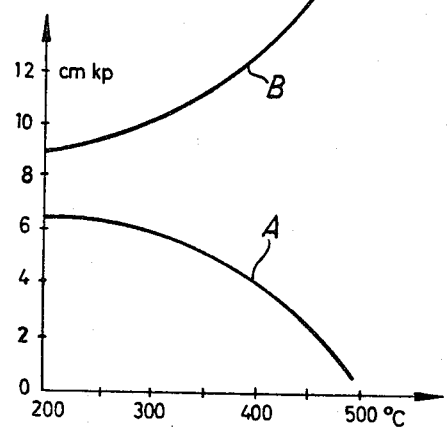
INVENTOR
Otto Beesch
by Michael S. Striker
atty United States Patent Office 3,434,461
Patented Mar. 25, 1969

3,434,461
SEALING ARRANGEMENT
Otto Beesch, Stuttgart-Sonnenberg, Germany, assignor to Robert Bosch G.m.b.H., Stuttgart, Germany
Filed June 30, 1966, Ser. No. 561,854
Claims priority, application Germany, July 10, 1965, B 82,786
Int. Cl. F02m 57/06
U.S. Cl. 123—32
4 Claims

ABSTRACT OF THE DISCLOSURE

An elongated male member includes an externally screw-threaded portion having a leading end. The male member is provided with an axial bore extending therethrough but terminating inwardly short of the leading end. Two substantially radial bores extend transversely of and communicate with the axial bore. The screw-threaded portion is provided with two grooves in the outer surface thereof extending axially from the leading end and communicating with the transverse bores. A female member is adapted to screw-threadedly receive the male member therein on introduction of the male member with its leading end into the female member. A ring member surrounds the free end of the female member and either the inner surface of the ring member or the outer surface of the female member, or both, are tapered in such a manner that, when the ring member is pushed onto the female member, it will cause radial compression of the latter so that the inner surface of the female member will tightly engage the outer surface of the male member and prevent escape of fluid passing through this structure.

---

The present invention relates to a sealing arrangement. More specifically, the present invention relates to a sealing arrangement in which the joint between a male and female member is to be fluid-tightly sealed.

Sealing arrangements in which the end portion of a male member, such as the end portion of a tube, is to be at least partially received in a female member, are notoriously difficult to seal against escape or entry of fluid. This is particularly true in cases where the joint of such members, that is the area which is to be fluid-tightly sealed, is subjected to temperature fluctuations and to extreme vibration. Since sealing arrangements of this type are very frequently necessary in the automotive industry, for instance in fuel injection devices or in combined spark plug- and fuel-injection devices, the industry has long sought for a satisfactory solution without, however, finding such a solution until now.

It is therefore a general object of the present invention to provide a reliably fluid-tight sealing arrangement of the type outlined above.

A more specific object of the present invention is to provide a sealing arrangement of the type set forth above in which a male member is at least partially received within a female member and is sealed therein against the escape of fluid.

An additional object of the invention is to provide a sealing arrangement of the type outlined which is very simple to construct and to assembly, and which is highly reliable in operation.

A further object of the invention is to provide such a sealing arrangement which is inexpensive to manufacture.

A concomitant object of the invention is to provide a sealing arrangement of this type which requires a minimum of components.

An additional object of the invention is to provide such a sealing arrangement which can be utilized in fuel-injection devices and/or in combined spark plug and fuel-injection devices.

Having these objects in mind, one embodiment of my invention comprises a male coupling member which has an outer surface. Also provided is an annular female coupling member having an inner surface, the male coupling member being received in the female coupling member and the surface of one of these members tapering in a predetermined direction. Finally, I provide displacing means for displacing the coupling members with reference to one another in a sense which effects deeper penetration of the male coupling member into the female coupling member in the above-mentioned predetermined direction, whereby the surfaces on the respective coupling members engage one another in sealing relationship and the male coupling member is subjected to radial compression.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary sectioned elevational view of an embodiment of the invention;

FIG. 2 shows the application of the embodiment of FIG. 1 in a fuel-injection device;

FIG. 3 shows the application of the embodiment of FIG. 1 in a combined spark-plug and fuel-injection device; and FIG. 4 shows in graphical form the torque required for disassembling the novel sealing arrangement.

Discussing now the drawing in detail, and firstly FIG. 1 thereof, it will be seen that the sealing arrangement per se is indicated with reference numeral 1. The sealing arrangement comprises three components, namely an annular female member 1 having a central passage which, in the embodiment of FIG. 1, conically converges in the direction towards the bottom of the drawing. The central passage is indicated with reference numeral 2. A second component, namely the male member 4, comprises an end portion 3 which in the embodiment of FIG. 1 is shown to taper conically in a manner complementary to the converging cross section of the passage 2 of member 1. A bolt 5 is provided, having a head and an externally screw-threaded stem which meshes with internal screw threads provided in the central bore of the male member 4. Of course, it should be understood in considering this embodiment that other arrangements are most certainly possible and that, for instance, the mating screw threads on the stem of bolt 5 and in the interior of the male member 4 are not necessary for achieving the desired purpose.

Returning, however, to the specific embodiment which is illustrated in FIG. 1 it will be noted that rotation of the bolt 5 in a sense causing the screw threads of the stem to mesh with the screw threads 6 in the interior of male member 4 will cause the head of the bolt 5 to press against the female member 1 in axial direction thereof. This will force the female member 1 to slide deeper onto the end portion 3 of male member 4 and, as a result of the provision of the tapering surfaces on the respective members, radial compression of the end portion of male member 4 will take place.

To assure that a reliable seal is established between the tapering surfaces of the members 1 and 4 on the one hand, and between the member 4 and the head of bolt 5 on the other hand, as well as to prevent accidental and undesired loosening of the bolt 5, it is necessary that the parts be stressed in axial direction, in direction normal to the axial direction, and also with respect to one another. They are therefore advantageously so configured that the inner surface 2 surrounding the passage of the female coupling member 1 so limits penetration of the end portion 3 of the male member 4 into this central passage that even when the end portion 3 has fully penetrated, an annular gap 7 will remain between the end face 8 of the male member 4 and inner face 9 of the head of the bolt 5.

Coming now to FIG. 2 it will be seen that the embodiment of the invention of FIG. 1 is in FIG. 2 shown to be utilized in a fuel-injection device. The female member is indicated with reference numeral 21 and is connected with the fuel pipe 24, corresponding to the male member, by a bolt 25. The assembly corresponds to that shown in FIG. 1. It will be noted in FIG. 2 that the bolt 25 is constructed as a spray nozzle whose inner end which is provided with screw threads meshing with similar threads 26 in the interior of the fuel pipe 24, and that its central bore is closed by means of a plug 27. Thus, fuel passing through the fuel pipe 24 is forced to pass through two lateral elongated slots 28 provided in the threads of the bolt 25. From these slots 28 the fuel enters into the tangential bores 29 which are offset with respect to one another and partly penetrate into the cylindrical wall of the atomizing chamber 30. The fuel then leaves the atomizing chamber 30 in direction of the arrow 31. Its further uses are of no consequence in connection with the present invention.

Coming now to FIG. 3 there is indicated therein another exemplary utilization of the novel arrangement shown in FIG. 1. FIG. 3 shows a combined spark plug and fuel injection device for gas turbines which is identified with reference numeral 40. This device incorporates the fuel-injection device shown in FIG. 2. The female member 21 has suitably secured thereto, for instance by a weld 32, an electrode 33. Actually the electrode 33, the female member 21, the bolt 25, and the fuel pipe 24 together constitute an electrode of the spark plug 40. The electrode 33 is so arranged as to confront with its free end one of the two mass electrodes 35 which are constituted by portions stamped and bent out from the cap 34. Together with this one mass electrode 35 the electrode 33 constitutes the spark gap 36. Fuel is fed through the channels 37 and 38 which meet one another at right angles within an electrically conductive plug 39 of vitreous material which serves as gas tight contact material and has been incorporated within the body of the spark plug 40 by melting prior to drilling of the channels 37 and 38. It will be noted that the plug 39 also holds the fuel pipe 24 in position. The fuel pipe 24 is provided at its free end which is connected with the female coupling member 21 with the internal threads 26, whereas the remainder of its central passage has smooth walls as indicated by reference numeral 37. It will be obvious that, prior to assembly of the novel sealing means to the fuel pipe 24, the passage 37 thereof must be extended through the plug 39 of vitreous material until it communicates with the channel 38.

It has been found that a combined spark plug and fuel-injection device such as shown in FIG. 3 is highly reliable, particularly in view of the very considerable vibrations and thermal fluctuations to which it is subjected in operation. A highly significant advantage of the novel invention is the fact that the torque which is required for releasing the bolt 25 and the female coupling member 21 from the male coupling member, that is the fuel pipe 24, increases as the temperature of the components or members increases. This is shown in FIG. 4 where two sealing arrangements of this general type are compared with one another. The bottom curve A shown in FIG. 4 indicates the torque required for releasing the sealing arrangement of a prior-art construction in which a segmented copper sealing ring has been used for sealing the ends of the fuel pipe. The initial assembly of this arrangement required at room temperature a torque of 8 cm. kp. It will be seen that as the temperature increases, the torque required for releasing the connection decreases significantly as is indicated by the curve A, whereas in the case of the other arrangement constructed in accordance with the present invention, which was also secured at 8 cm. kp. at room temperature, the curve B indicates that the torque required for releasing the arrangement increases equally significantly as the temperature of the parts increases. In view of the fact that during operation of such devices as fuel injectors or combined spark-plugs and fuel injectors of the type shown in FIG. 3, elevated temperatures coincide with increased vibrations, any increase in the torque required for releasing the sealing arrangement is highly advantageous. Of course, devices of the type in question are subjected to temperature fluctuations rather frequently and the quality of the seal will consequently also fluctuate unless, in accordance with a further consideration of the present invention, the various parts, that is the male member, the female member and the bolt, are made of materials which have either identical or substantially identical coefficients of thermal expansion. For the exemplary devices of FIGS. 2–4 the use of chrome-nickel steel has been found to be advantageous.

It will be readily understood that modifications and different embodiments of the basic invention are possible and that they will, in fact, offer themselves readily to those skilled in the art. For instance, there is no need for the end portion 3 of male member 4 (see FIG. 1) to have a taper, as long as the cross sectional area of the central bore in the female member 1 converges. On the other hand, it would also be possible to have the surface of the end portion 3 converge and to have the passage in female member 1 be of constant cross section. Again, at least the end portion 3 of male member 4 could be of a material which is softer than the material of female member 1.

It will be understood that each of the elements described above, or two or more together, may also find a useful application in other types of sealing arrangements differing from the types described above.

While the invention has been illustrated and described as embodied in a sealing arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A structure of the character described, comprising an elongated male member including a first portion and an externally screw threaded second portion having an outer circumferential surface and extending from said first portion and having one end rigid with said first portion and another end remote therefrom, said male member being provided with an axial bore extending longitudinally thereof but being closed at said other end, a pair of transverse bores in said second portion communicating with said axial bore intermediate said ends and extending substantially radially of said axial bore, and a pair of axial grooves provided in said outer circumferential surface communicating with the respective transverse bores and extending to said other end; a female member having an outer surface and an internally screw-threaded end portion having an inner face, said second portion of said male member being threadedly receivable in said end portion of said female member; and means for deflecting said inner face and said outer circumferential surface into tight engagement whereby, when a fluid passes through said female member through said grooves and said transverse bores into said axial bore of said male member, escape of such fluid between the meshing screw threads of said male and female members is prevented.

2. A structure as defined in claim 1, wherein said means comprise a ring member having an inner peripheral surface surrounding and juxtaposed with said outer circumferential surface, one of the last-mentioned surfaces having a taper in a predetermined direction and said ring member being constructed and arranged so as to be slidingly displaced in direction rearwardly of said end portion in response to threading of said second portion of said male member deeper into said female member, whereby said ring member effects radial compression of said end portion and deflecting of said inner face into tight engagement with said outer circumferential surface.

3. A structure as defined in claim 2, wherein at least said male and female members consist of metallic material.

4. A structure as defined in claim 2, wherein said taper is on the order of 15°.

References Cited

UNITED STATES PATENTS

| | | | |
|---|---|---|---|
| 1,089,970 | 3/1914 | Schmitt | 285—332 |
| 1,323,195 | 11/1919 | Roy et al. | 279—95 XR |
| 1,359,923 | 11/1920 | Savage. | |
| 1,943,028 | 1/1934 | Rabezzana | 285—92 |
| 2,012,146 | 8/1935 | Stephan. | |
| 2,494,829 | 1/1950 | Pardee | 279—95 |
| 3,167,333 | 1/1965 | Hall et al. | 285—333 |

LAURENCE M. GOODRIDGE, *Primary Examiner.*

U.S. Cl. X.R.

123—169